US006876703B2

(12) United States Patent
Ismaeil et al.

(10) Patent No.: US 6,876,703 B2
(45) Date of Patent: Apr. 5, 2005

(54) METHOD AND APPARATUS FOR VIDEO CODING

(75) Inventors: Ismaeil R. Ismaeil, Richmond (CA); Alen Docef, Vancouver (CA); Faouzi Kossentini, Vancouver (CA)

(73) Assignee: UB Video Inc., Vancouver (CA)

( * ) Notice: Subject to any disclaimer, the term of this patent is extended or adjusted under 35 U.S.C. 154(b) by 733 days.

(21) Appl. No.: 09/842,810

(22) Filed: Apr. 27, 2001

(65) Prior Publication Data

US 2002/0025001 A1 Feb. 28, 2002

Related U.S. Application Data

(60) Provisional application No. 60/203,641, filed on May 11, 2000.

(51) Int. Cl.[7] .................................................. H04N 7/12
(52) U.S. Cl. .................................................. 375/240.16
(58) Field of Search .................. 375/240.16, 240.24, 375/240.01, 240.2; 348/402.1, 407.1, 413.1, 416.1; 382/236, 250; H04N 7/12

(56) References Cited

U.S. PATENT DOCUMENTS

| | | | |
|---|---|---|---|
| 4,449,194 A | | 5/1984 | Wilhelm |
| 5,129,015 A | | 7/1992 | Allen et al. |
| 5,319,724 A | | 6/1994 | Blonstein et al. |
| 5,329,318 A | | 7/1994 | Keith |
| 5,515,114 A | | 5/1996 | Murata |
| 5,539,836 A | | 7/1996 | Babkin |
| 5,719,961 A | | 2/1998 | Normile et al. |
| 5,731,850 A | | 3/1998 | Maturi et al. |
| 5,757,668 A | | 5/1998 | Zhu |
| 5,822,003 A | | 10/1998 | Girod et al. |
| 5,903,313 A | | 5/1999 | Tucker et al. |
| 6,067,322 A | | 5/2000 | Wang |
| 6,097,757 A | | 8/2000 | Boice et al. |
| 6,108,378 A | | 8/2000 | Keesen |
| 6,130,912 A | * | 10/2000 | Chang et al. .......... 375/240.16 |
| 6,154,491 A | | 11/2000 | Uetani |
| 6,195,389 B1 | * | 2/2001 | Rodriguez et al. ...... 375/240.16 |
| 6,269,174 B1 | * | 7/2001 | Koba et al. .................. 382/107 |
| 6,434,196 B1 | * | 8/2002 | Sethuraman et al. ... 375/240.12 |
| 6,594,313 B1 | * | 7/2003 | Hazra et al. ........... 375/240.16 |
| 6,654,420 B1 | * | 11/2003 | Snook .................... 375/240.16 |
| 6,697,427 B1 | * | 2/2004 | Kurak et al. ........... 375/240.03 |
| 6,757,330 B1 | * | 6/2004 | Hsu ....................... 375/240.17 |

OTHER PUBLICATIONS

Wahashi et al., *Bit Reduction of DCT Basis for Transform Coding*, Electronics and Communications in Japan, Part 1, vol. 80, No. 8, 1997, pp. 81–91.

* cited by examiner

*Primary Examiner*—Nhon Diep
(74) *Attorney, Agent, or Firm*—Oyen Wiggs Green & Mutala

(57) ABSTRACT

A video coding method progressively refines a predicted motion vector to obtain an estimated motion vector. Subsequent steps are omitted if the estimated motion vector matches a current macroblock. Variable matching thresholds can permit dynamic adjustment of image quality and computational cost to optimize encoding performance for available computational resources. The method permits control of desired encoding speed and bit rate by adjusting encoding parameters. Video coders according to the invention may comprise a motion estimator, transform computer and coder each of which operates according to one or more parameters. A speed rate control and/or a bit rate control may adjust the parameters to maintain a desired encoding speed and output bit rate. A coder according to the invention may be implemented in software running on a general purpose computer. The method may be used in block-based video encoders including MPEG-2 and H.263 encoders.

13 Claims, 6 Drawing Sheets

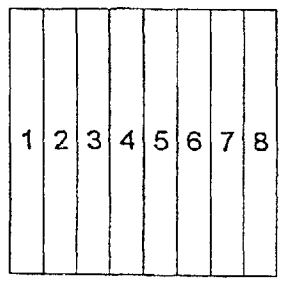
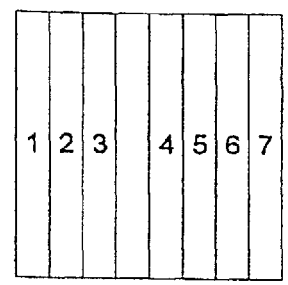
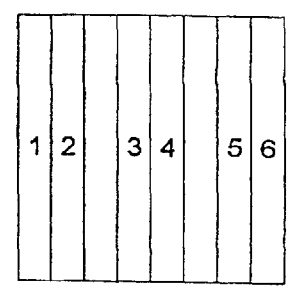
FIG. 8A     FIG. 8B     FIG. 8C
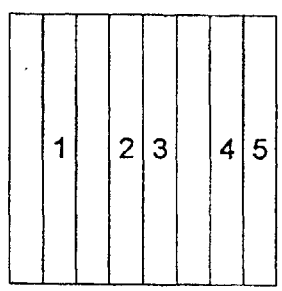
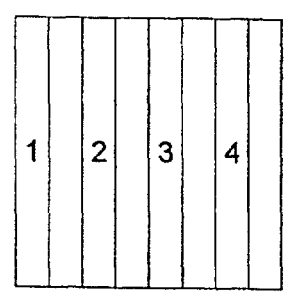
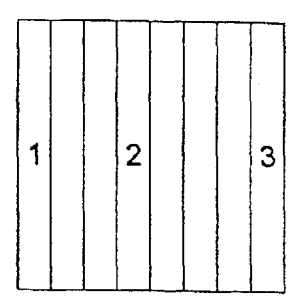
FIG. 8D     FIG. 8E     FIG. 8F
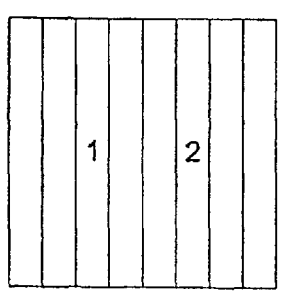
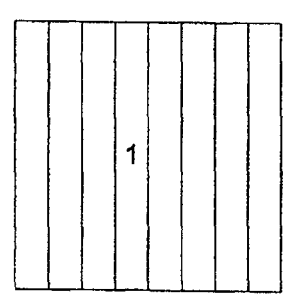
FIG. 8G     FIG. 8H

METHOD AND APPARATUS FOR VIDEO CODING

CROSS REFERENCE TO RELATED APPLICATION

This application claims the benefit of the filing date of U.S. provisional patent application No. 60/203,641 filed on May, 11, 2000 and entitled SYSTEM AND APPARATUS FOR COMPUTATION-DISTORTION OPTIMIZED DCT-BASED VIDEO CODING which is incorporated herein by reference.

TECHNICAL FIELD

This invention relates to systems for compressing and encoding video signals. The invention has particular application to block-based motion-compensated encoders. The invention has particular application in the field of real-time video encoding.

BACKGROUND

The field of multimedia communications is burgeoning. As a result there is an increased demand for systems capable of efficiently encoding video signals. Dedicated hardware video encoders are becoming available. However, there remains a need for practical software-based video encoders based upon general purpose computer processors or digital signal processors. One challenge faced in designing software-based video encoding systems is that such software-based systems may be used on computer systems which have various levels of processing power. The system may provide acceptable performance when run on some computers but provide unacceptable performance on computers which have less computational resources available for use by the system.

Various standards for video coding have been promulgated. These include the MPEG-2 standard (formally known as ISO/IEC 13818) and the H.263 standard. The MPEG-2 standard applies to decoders and defines the characteristics of a byte stream representing a compressed video signal that can be successfully decoded by MPEG-2 decoders. Such coding standards have been used successfully to encode video in teleconferencing systems, digital television broadcasting, computer games, closed circuit television security applications and digital versatile disks (DVDs). These standards provide encoding methods which involve motion estimation (ME), motion compensation (MC), discrete cosine transformation (DCT), quantization and variable length coding (VLC). Some of these tasks are computationally intensive. Motion estimation, motion compensation and performing DCT operations are particularly computationally intensive.

The MPEG-2 and H.263 standards assume that the value of a particular pixel (pel for short) in an image can be predicted from the values of nearby pels within the same frame (using intra-frame coding techniques) or from the values of pels in a nearby frame (using inter-frame techniques). Current video encoding methods typically divide each video frame into a number of macroblocks. For each macroblock a motion vector is obtained. The motion vector indicates a location relative to the macroblock which contains pels having values similar to the pel values in the macroblock. After the motion vector has been obtained, residual data, representing the difference between pels in the location identified by the motion vector and pels in the macroblock is encoded. In most current video encoders DCT is used for encoding the residual data.

There is a need for methods and systems for video encoding which are more versatile than currently available methods and systems. There is a particular need for such systems and methods which can be readily adapted for use on various hardware.

SUMMARY OF THE INVENTION

Illustrative embodiments of the present invention are described in the following detailed description. The invention has a number of aspects. One aspect of the invention provides a method for obtaining an estimated motion vector for use in block-based video encoding. The method comprises refining a predicted motion vector for a current block to obtain an estimated motion vector in a sequence comprising a plurality of steps. Before each of a plurality of the steps in the sequence the method computes a similarity value between the block and another block indicated by the current estimated motion vector. The method compares the similarity value to a threshold. If the comparison indicates that the current estimated motion vector provides a match between the current block and the another block which is better than a match corresponding to the threshold then subsequent steps in the sequence are not performed.

In preferred embodiments of the invention the similarity measure is a sum of absolute differences although other similarity measures may also be used.

Refining the predicted motion vector preferably comprises performing one or more frame motion estimation steps followed by one or more field motion estimation steps. The frame motion estimation steps may include a low resolution frame motion estimation step, a full pel frame motion estimation step and a half pel frame motion estimation step. The field motion estimation steps may comprise a low resolution field motion estimation step, a full pel field motion estimation step and a half pel field motion estimation step.

A further aspect of the invention provides a video coding method comprising providing a video encoder comprising at least a motion vector estimator, a transformation computer and a coder, running on a computer platform. The video encoder operates in a manner determined by a plurality of parameters. The method includes providing a plurality of sets of parameters. Each set of parameters causes the video encoder to provide a different balance between output quality and computation. The video encoder is configured with a first one of the sets of parameters. The method measures a time taken for the video encoder to encode a series of blocks. If the time taken exceeds a predetermined time, the method configures the video encoder with a second one of the sets of parameters. The video encoder encodes with less computation when configured with the second set of parameters than it does when configured with the first set of parameters.

In preferred embodiments the parameters comprise a plurality of thresholds, and the method includes obtaining estimated motion vectors for blocks by performing a plurality of motion estimation steps. Before at least two of the plurality of motion estimation steps the method computes a similarity value between the block and another block indicated by the current estimated motion vector, compares the similarity value to a threshold, and does not perform one or more subsequent motion estimation steps if the comparison indicates that the current estimated motion vector provides a match between the current block and the another block which is better than a match corresponding to a corresponding one of the thresholds.

Also in preferred embodiments the transformation computer performs a quantized discrete cosine transformation and the method comprises: determining a volume of output encoded video data corresponding to a quantity of input video data, comparing the volume to a threshold and, if the volume exceeds the threshold, increasing a value for a quantum step used in the discrete cosine transformation so as to reduce a bit rate of the output encoded video data.

A still further aspect of the invention provides a video coding method comprising sequentially processing a plurality of blocks in an input video signal to produce an encoded output video signal. Processing each of the blocks comprises obtaining an estimated motion vector for each block by taking each block, in turn, as a current block and: for each current block determining an initial estimated motion vector, computing a first similarity measure between the current block and a block identified by the initial estimated motion vector and comparing the first similarity measure to a threshold; if the comparison indicates that the match between the current block and a block identified by the initial estimated motion vector is better than the threshold, using the initial estimated motion vector as an estimated motion vector for the current block and proceeding to a transformation step; and, if the comparison indicates that the match between the current block and a block identified by the initial estimated motion vector is worse than the threshold, performing one or more motion vector refinement steps on the initial estimated motion vector to produce an estimated motion vector for the current block before proceeding to the transformation step. The transformation step preferably comprises performing a quantized discrete cosine transform operation.

Another aspect of the invention provides a program product which comprises a medium carrying a set of computer-readable signals containing computer-executable instructions which, when run by a computer, cause the computer to execute a method according to the invention.

Yet another aspect of the invention provides a video coder comprising a motion vector estimator; a transformation computer; a coder; a memory holding a plurality of sets of parameters and a speed control. A currently selected one of the sets of parameters causes the motion vector estimator, transformation computer and coder to encode an input video signal with a balance between output quality and computation. The speed control comprises a timer connected to measure a time taken for the video encoder to encode a series of one or more blocks. The speed control is adapted to select an alternative one of the sets of parameters which encodes with less computation than a currently selected one of the sets of parameters in response to detecting that the time taken is longer than a threshold time. The video encoder may be implemented in software running on a computer platform.

Further features and advantages of the invention are described below.

BRIEF DESCRIPTION OF DRAWINGS

In figures which illustrate non-limiting embodiments of the invention.

DESCRIPTION

This invention provides a video encoder which permits performance to be traded off against available computational power. Preferred embodiments of the video encoder include a motion estimation subsystem which is considered to be novel.

Figure 1:
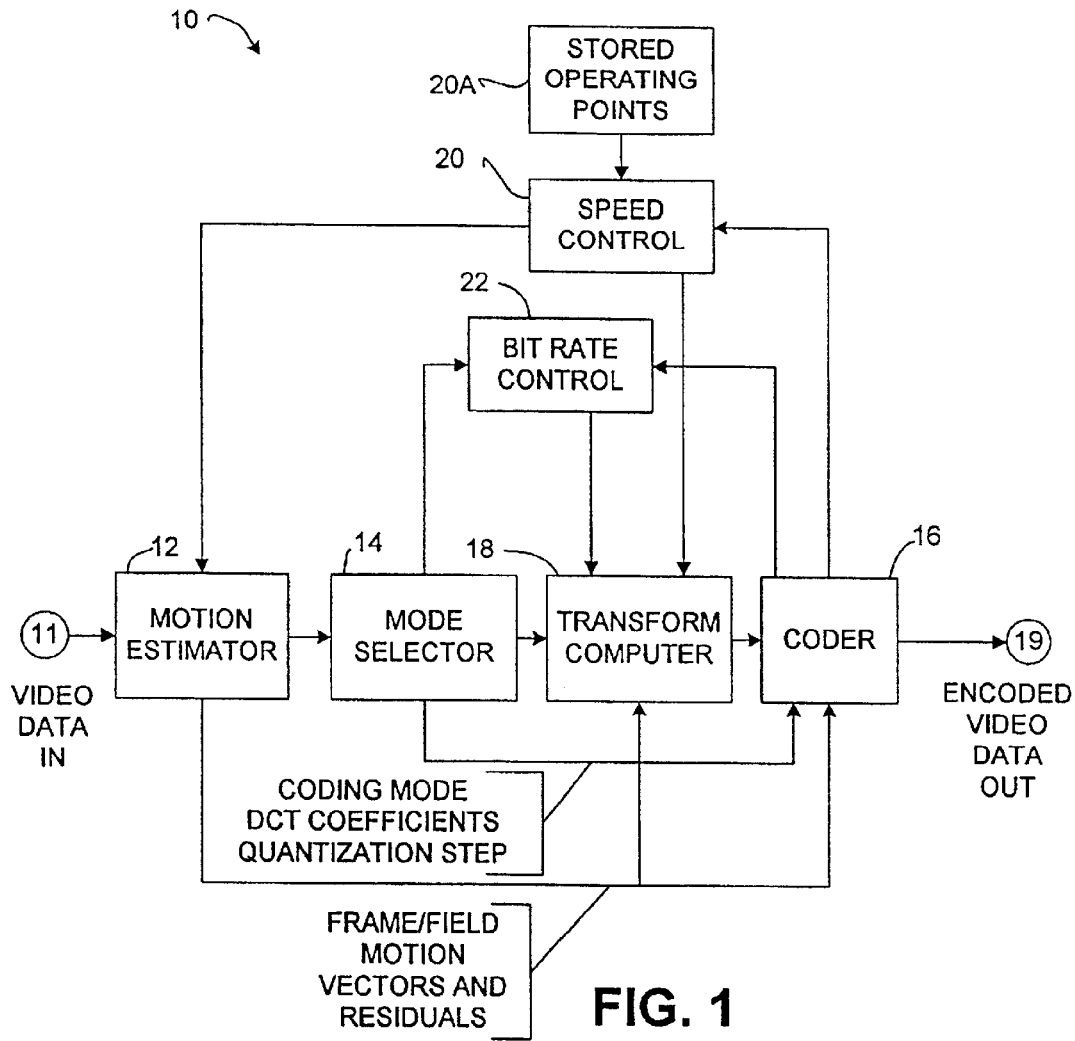
FIG. 1 is a block diagram showing major functional components of a system according to a preferred embodiment of the invention.

FIG. 1 shows major functional components of an encoder 10 according to a preferred embodiment of the invention. Encoder 10 receives video data at an input 11. The video data is first processed by a motion estimator 12. Motion estimator 12 works in conjunction with a mode selector 14. Mode selector 14 determines an appropriate coding mode, and passes mode control signals to a coder 16 and a transformation computer 18. Transformation computer 18 computes a transformation of residual data. The transformation is a DCT transformation. In the case of MPEG-2 encoding, the coding mode specifies macroblock encoding type (intra or inter), motion compensation direction (forward, backward or bidirectional), motion compensation type (non, frame or field) and DCT type (non, frame or field).

The transformed data from transformation computer 18 and the motion vector from motion estimator 12 are passed to coder 16. Coder 16 generates encoded video data at an output 19 and also provides data to a speed control 20 and a rate control 22. Speed control 20 determines an appropriate tradeoff between performance and computation requirements and controls motion estimator 12 and transformation computer 18 to maintain the desired balance between performance and computational requirements.

Motion estimator 12 and transformation computer 18 accept control parameters. The control parameters affect the operations of these components. The selection of control parameters affects the amount of computational resources required by the component and the quality of the encoded video data at output 19. Speed control 20 selects control parameters based on the characteristics of the video data being encoded to obtain a good compromise between required computation and performance. In a preferred embodiment of the invention the parameters include a computation-distortion parameter $\beta$, which is described below, parameters affecting the operation of transformation computer 18 (e.g. QDCT coefficients and quantization step) and a set of thresholds that are used to determine whether various motion estimation steps should be performed on the portion of the video data being processed.

Speed control 20 preferably selects sets of parameters that produce the highest quality encoded signal at output 19 for the computational resources which are currently available. The best sets of parameters to use will vary depending upon the environment in which encoder 10 is running and, generally to a smaller degree, upon the content of the video signal being encoded. Encoder 10 is first optimized. The optimization identifies the best sets of parameters to use for various levels of available computational resources.

One way to optimize encoder 10 would be to apply a brute force method which tries every possible combination of the parameters and records the achieved quality (PSNR) and encoding speed (frames/second) at a given bit rate for each combination of parameters (Instead of encoding speed, the number of computations required to perform the encoding could be measured. In general, the number of computations required for encoding a video signal will be inversely proportional to the encoding speed). The best set of parameters for the current video data and available computational resources could then be selected by plotting the convex hull of the set of (PSNR, fps) points and selecting operating points which fall on this curve. This exhaustive approach is undesirably computationally intensive, especially in cases where there are a large number of parameters.

A preferred mechanism for choosing optimal sets of parameters is to begin at a point on the distortion/computation plane which provides the lowest distortion (i.e. the highest quality) and the highest computational cost. A number of new operating points is then constructed. To obtain each new point, one of the parameters is varied by a small amount. The new point which yields the smallest increase in distortion for the greatest decrease in computational cost (i.e. the new point which is connected to the starting point by a line having the lowest slope) is selected and the step of generating new points by slightly varying each of the parameters and selecting one of the new points which results in the smallest decrease in quality for the greatest decrease in computational cost is iterated until quality is degraded to an unacceptable level.

The optimization process provides N sets of parameter values. Each set of parameter values may be called an "operating point". Each operating point provides a certain encoding time or performance. N is chosen to be a convenient number. The operating points are optimized in the sense that, for a given amount of computation, each operating point provides the best, or nearly the best quality output. The parameters representing the operating points are stored in a memory or other computer readable medium as stored sets of parameters 20A. Separate sets of N operating points may be acquired for different bit rates.

Table I illustrates, for example, a set of 20 operating points which provide different MPEG-2 encoding speeds when run on a particular 450 MHz Pentium™ III computer. The parameters specified for each operating point are the parameters set out in the description of the preferred embodiment below.

TABLE I

Operating Points for an Example MPEG-2 Encoder

| $P_i$ | $T_1$ | $T_2$ | $T_3$ | $T_4$ | $T_5$ | $T_6$ | $T_7$ | $\beta$ | $k$ | $N_r$ | $N_c$ | PSNR (dB) | Frame Rate (fps) |
|---|---|---|---|---|---|---|---|---|---|---|---|---|---|
| 1 | 0 | 0 | 0 | 0 | 0 | 0 | 0 | 1 | 1 | 8 | 8 | 30.02 | 2.96 |
| 2 | 0 | 0 | 0 | 2000 | 0 | 0 | 0 | 1 | 1 | 8 | 8 | 30.2 | 3.85 |
| 3 | 0 | 0 | 0 | 2500 | 0 | 0 | 0 | 1 | 1 | 8 | 8 | 30.21 | 4.07 |
| 4 | 210 | 0 | 0 | 2500 | 0 | 0 | 0 | 1 | 5 | 6 | 6 | 30.25 | 4.36 |
| 5 | 210 | 0 | 0 | 3200 | 0 | 0 | 0 | 1 | 5 | 5 | 2 | 30.19 | 4.88 |
| 6 | 275 | 0 | 0 | 3200 | 0 | 0 | 0 | 1 | 5 | 5 | 2 | 30.18 | 4.88 |
| 7 | 275 | 0 | 0 | 3500 | 0 | 0 | 0 | 1 | 5 | 5 | 2 | 30.15 | 5.01 |
| 8 | 275 | 0 | 0 | 3500 | 420 | 0 | 0 | 30 | 5 | 5 | 2 | 30.06 | 5.44 |
| 9 | 275 | 0 | 0 | 4000 | 420 | 0 | 0 | 55 | 5 | 5 | 2 | 30 | 5.52 |
| 10 | 275 | 0 | 0 | 4700 | 420 | 0 | 0 | 55 | 5 | 5 | 2 | 29.93 | 5.74 |
| 11 | 330 | 0 | 0 | 4700 | 420 | 0 | 0 | 55 | 5 | 3 | 2 | 29.89 | 5.85 |
| 12 | 330 | 200 | 1350 | 4700 | 420 | 1100 | 0 | 55 | 5 | 3 | 2 | 29.74 | 6.63 |
| 13 | 330 | 200 | 1350 | 4700 | 420 | 1100 | 0 | 55 | 16 | 3 | 2 | 29.64 | 6.92 |
| 14 | 330 | 200 | 1350 | 4700 | 420 | 1100 | 0 | 55 | 64 | 3 | 2 | 29.39 | 7.11 |
| 15 | 330 | 200 | 1350 | 4700 | 420 | 1100 | 0 | 55 | 100 | 3 | 2 | 29.21 | 7.19 |
| 16 | 330 | 400 | 1350 | 4700 | 420 | 1100 | 0.4 | 55 | 100 | 3 | 2 | 28.96 | 7.55 |
| 17 | 330 | 600 | 1350 | 15000 | 420 | 1100 | 0.4 | 55 | 100 | 3 | 2 | 28.62 | 8.44 |
| 18 | 400 | 800 | 1350 | 15000 | 420 | 1100 | 0.4 | 55 | 100 | 3 | 2 | 28.3 | 9.16 |
| 19 | 1000 | 1000 | 1350 | 15000 | 420 | 1100 | 0.4 | 55 | 100 | 3 | 2 | 28.06 | 9.53 |
| 20 | 1500 | 1200 | 1350 | 15000 | 420 | 1100 | 0.4 | 55 | 100 | 3 | 2 | 27.89 | 9.77 |

After a set of optimal operating points has been discovered for encoder 10 then speed control 20 selects an appropriate one of the operating points to achieve a currently required computation-performance compromise. In methods according to the preferred embodiment of the invention, speed control 20 is configured for a particular computing platform by performing the parameter selection method described above to obtain a number of operating points for that computing platform. If it is desired to use the encoder 10 for encoding a certain kind of video data then that certain kind of video data may be used in the parameter optimization. Otherwise a combination of various kinds of video data may be used for parameter optimization.

Distortion may be measured, for example, by computing the peak signal to noise ratio (PSNR). This may be done by comparing an original image to a reconstructed image that has been encoded and decoded. PSNR is computed by determining the root mean squared error (RMSE) of the reconstructed image as follows:

$$RMSE = \sqrt{\frac{\sum_{all\ pixels} (O_{ij} - R_{ij})^2}{M^2}} \quad (1)$$

where M is the number of pixels in the image and $O_{ij}$ and $R_{ij}$ are the pixel values at the coordinates (i, j) in the original and reconstructed images respectively. PSNR in decibels (dB) is given by:

$$PSNR = 20\log_{10}\left(\frac{255}{RMSE}\right) \quad (2)$$

Figure 2:
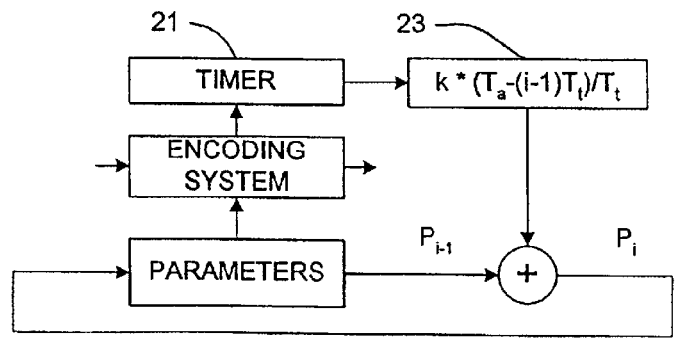
FIG. 2 is a block diagram illustrating a system for adaptively adjusting encoding parameters to maintain a desired encoding rate.

In some cases it is desirable to provide dynamic modification of the parameters in order to ensure that certain constraints will be satisfied. For example, speed control 20 may be provided with a target encoding time. The target encoding time may be small enough to permit real-time encoding of the video data. In this case, speed control 20 may adjust the parameters in order to ensure that the constraint is satisfied. FIG. 2 illustrates a mechanism for providing an adaptive framework for setting parameters to satisfy a time constraint. This mechanism provides a feedback loop which adjusts the parameters to compensate for any mismatch between the time, $T_a$, actually taken to encode the previous frame and a target time for encoding each frame, $T_t$.

A timer 21 measures a time $T_a$ actually taken to encode a previous frame. An index $P_i$ points to the set of parameters for the current operating point. Index $P_i$ is adjusted by an amount computed in block 24 and then rounded to the nearest integer value. The amount by which $P_i$ is adjusted depends upon the difference between $T_a$ and $T_t$. If $T_a$ is overly long then index $P_i$ is changed to point to a set of parameters which corresponds to lower computational requirements. If $T_a$ is overly short then index $P_i$ is changed to point to a set of parameters which provides higher quality at the cost of increased computational requirements.

Encoding some frames will involve more computation than encoding other frames. Preferably the target encoding time is not enforced on a frame-by frame basis, but is rather enforced, on average, for a group of frames. A target encoding time may, for example, be set for a group of frames. The group may, for example, comprise 5 to 20 frames. In a currently preferred embodiment of the invention the group includes 12 frames. In this case, the parameters may be adjusted according to:

$$P_i = P_{i-1} + k\frac{(T_{a(i-1)} - (i-1) \times T_t)}{T_t} \quad (3)$$

where (i–1) is the number of frames which have already been encoded in the current set of frames, $T_{a(i-1)}$ is the actual time taken to encode the previous (i–1) frames and k is a constant value which, in the currently preferred embodiment of the invention, is in the range of 5 to 15 and is most preferably about 10.

Rate control 22 controls the operation of encoder 10 to maintain a target bit rate at output 19. The target bit rate is typically selected to match the capacity of a data channel on which the encoded video signal will be transmitted. To achieve a target bit rate, rate control 22 preferably adjusts the size of a quantization step used by transform computer 18. Rate control 22 measures the number of bits used for a previous macroblock and changes the quantization step for the current macroblock to ensure that the target bit rate will be met, on average. Mode selector 14 could effect rate control in certain cases by forcing one or more entire macroblocks to be skipped.

Figure 3:
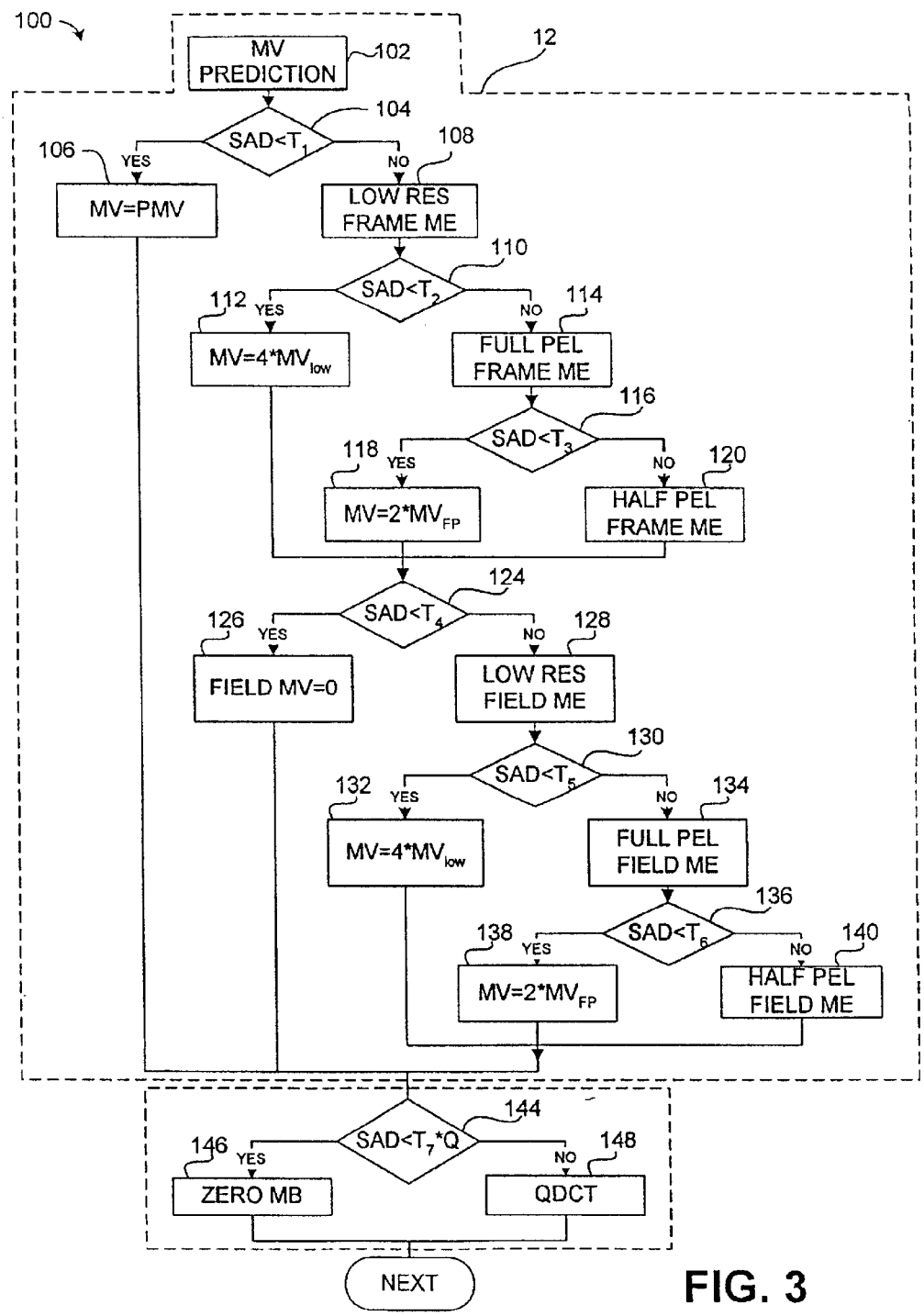
FIG. 3 is a flow chart illustrating a method of MPEG-2 encoding according to the invention.

In the preferred embodiment of the invention the parameters include a number of thresholds. The thresholds are used to determine whether or not to perform certain encoding steps. The use of such thresholds avoids the need to incur the computational cost of certain steps in cases where the step is not needed to achieve the desired output quality. FIG. 3 shows, for example, an MPEG-2 video encoding method 100 which illustrates a possible way to apply thresholds according to the invention. Those skilled in the art will appreciate that this invention may be applied to other block-based encoders.

Method 100 obtains a motion estimate. Motion estimation involves searching for the best match between a block currently being processed (the "current block") and candidate blocks in a confined area of the previously encoded frame. Block matching may be performed, for example, by computing a similarity measure between a candidate block and the current block. A suitable similarity measure which is used in currently preferred embodiments of the invention is the sum of absolute differences ("SAD"). Other similarity measures could also be used for block matching. Most typically, video data is processed in macroblocks. In systems which adhere to the MPEG-2 standard, each macroblock consists of a 16 pixel by 16 pixel block of luminance values and two 8 by 8 blocks of chrominance values.

Figure 4:
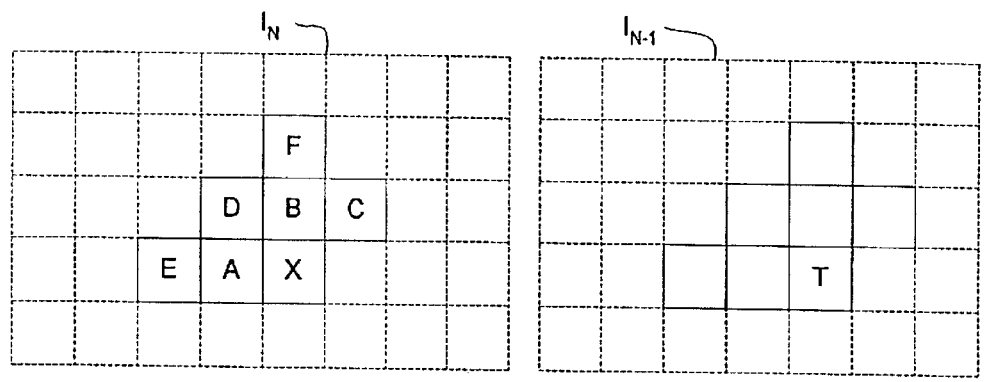
FIG. 4 is a diagram illustrating a spatial region of support for a motion vector prediction method used in a preferred method of the invention.
Figure 6:
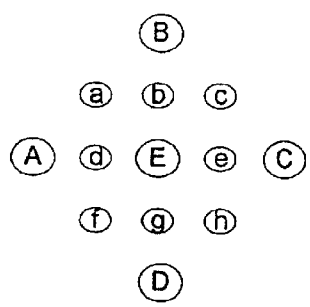
FIG. 6 is a diagram identifying half-pel points used in half pel frame motion estimation.

Method 100 begins by performing a motion vector prediction (step 102). This may be done in various ways. The preferred embodiment of the invention uses the motion vector prediction method described in I. Ismaeil et al., *Efficient Motion Estimation Using Spatial and Temporal Motion Vector Prediction*, Proc. of ICIP99, Kobe, Japan, October 1999, which is hereby incorporated by reference. In this motion vector prediction method, several blocks in the spatial region of support shown in FIG. 4 are considered together with the spatially corresponding blocks from the previous frame. In FIG. 4, the block currently being processed is indicated by the reference letter X. The predicted motion vector is selected from the motion vectors corresponding to the labelled macroblocks by selecting the motion vector which provides the best match (e.g. lowest SAD).

While it is not preferred, other motion vector prediction methods could also be used to obtain an initial predicted motion vector. Some examples of alternative ways to obtain an initial predicted motion vector are the following:

- the median of three previously coded motion vectors corresponding to the macroblocks to the left, above, and above-right of the macroblock being encoded;
- the method described in Y. Zhang et al. *Predictive block-matching motion estimation for TV coding Part II—Inter-frame prediction*, IEEE Transactions on Broadcasting, vol. 37, p 102, September, 1991;
- J. Chalidabhongse et al. *Fast motion vector estimation by using spatio-temporal correlation of motion field*, SPIE Proc. Visual Communications and Image Processing, vol. 2501, p. 810, 1995; and,
- Y. Lee et al., *Predictive RD-constrained motion estimation for very low bit rate video coding*, IEEE Transactions on Selected Areas in Communications, vol. 15, p. 1752, December 1997. The predicted motion vector produced by step 102 is used as a basis for motion estimation.

The accuracy of the motion estimation can be affected by the accuracy of the predicted motion vector. It is preferable to use a method which will generally produce a predicted motion vector which is accurate. If the predicted motion vector is far from the best match motion vector then the motion estimation may either produce a wrong estimated motion vector (corresponding to a local minimum) or take an undesirably large number of operations to locate an acceptable estimated motion vector. A wrong estimated motion vector can affect the quality of encoding of subsequent frames.

Step 104 computes the SAD between the current block and the candidate block in the previous frame which is identified by the predicted motion vector of step 102. This SAD is compared to a first threshold $T_1$. If the SAD is less than $T_1$ then the predicted motion vector is used as the estimated motion vector (step 106) and motion estimation terminates. If the SAD equals or exceeds $T_1$ then a low resolution frame motion estimation step 108 is performed. Step 108 may comprise, for example, downsampling the current frame by a factor of two in each direction. Then, either a full search algorithm or any of a variety of fast search algorithms may be used to generate an estimated motion vector.

Figure 5A:
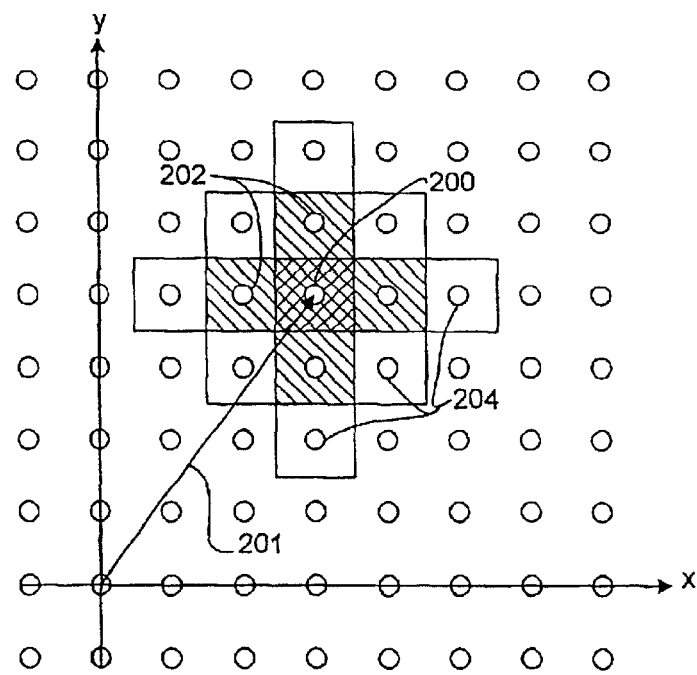
FIGS. 5A and 5B are diagrams illustrating a fast diamond-shaped search area and a search path which can be used therewith.
Figure 5B:
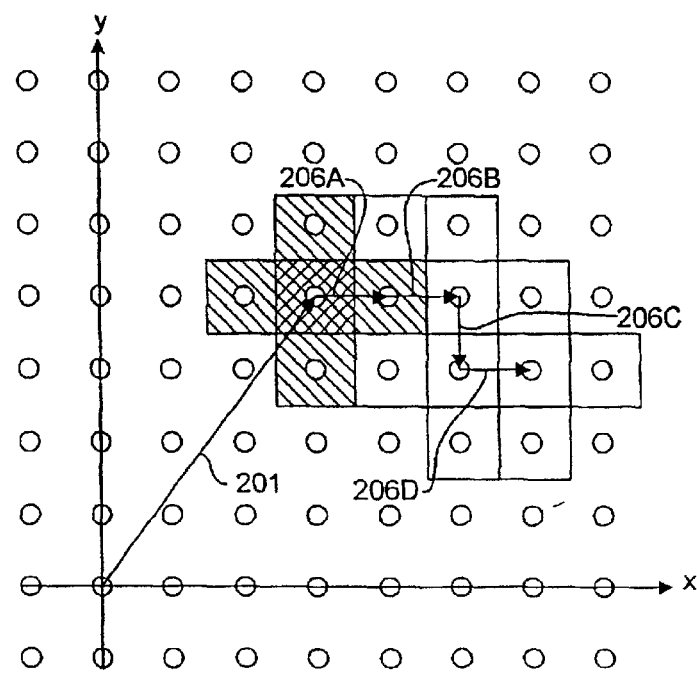

In the preferred embodiment of the invention a fast diamond-shaped search area is used. FIGS. 5A and 5B show such search areas. In the embodiment of FIG. 5A, the search begins at a search center 200 identified by the predicted motion vector 201. Candidate points are located within a diamond-shaped contour centered on search center 200. The search center is considered first, then only those points 202 which are immediate neighbours of the search center are considered. As the search continues, additional sets of candidate points 204 which lie within larger diamond-shaped contours may be considered also. A method for searching for an estimated motion vector is described in more detail in M. Gallant et al. *A computation constrained block-based motion estimation algorithm for low bit rate video coding*, IEEE Trans on Image Processing vol. 8, No. 12, December, 1999.

Preferably the search center moves as shown in FIG. 5B. In the embodiment of FIG. 5B, the search center floats. At each step in the search the candidate points include the search center and the four immediate neighbours of the search center. Lines 206A through 206D illustrate the motion of the search center as the search proceeds.

The SAD for the best motion vector estimate resulting from step 108 is compared in step 110 to a second threshold value $T_2$. If the SAD is less than $T_2$ then the motion vector estimate of step 108 is used (after multiplication by 4 to compensate for the downsampling) (step 112) and motion estimation terminates. If the SAD is greater than or equal to $T_2$ then a full pel vector search is performed (step 114).

In any case, if the SAD corresponding to the best candidate in the search area for the current step is larger than the SAD for the best candidate in the previous step then motion estimation also terminates.

The full pel search of step 114 preferably involves searching in a square region centered at a point determined by upsampling the low resolution motion estimation vector produced by step 108. At the conclusion of the full pel search, The SAD for the best motion vector estimate resulting from step 114 is compared in step 116 to a third threshold value $T_3$. If the SAD is less than $T_3$ then the motion vector estimate of step 114 is multiplied by two and used (step 118) and motion estimation terminates. If the SAD is greater than or equal to $T_3$ then a half pel vector search is performed (step 120).

Both MPEG-2 and H.263 decoders support half-pel motion compensation. Half-pel motion compensation provides a better estimate of motion for objects that have moved by a fractional number of pixels between frames. The half-pel motion estimation of step 120 may be performed by taking the eight half-pel locations surrounding the motion vector produced by full-pel motion estimation step 114. To reduce the number of computations required one can use the method described in B. Erol et al. *Efficient coding and mapping algorithms for software-only real time video encoding at low bit rates* IEEE Trans on Circuits and Systems for Video Technology 1998 vol. 10, No. 6, pp. 843–856, September 2000. In this method integer-pixel SAD values are calculated for the four nearest macroblocks surrounding the best integer-pixel candidate as shown in FIG. 5. From these values the corresponding half-pel SAD values can be estimated. The interpolation formulas for half-pel points a and b are as follows:

$$a = \frac{28}{32} \frac{A+B+E+1}{3} \tag{4}$$

and, $$b = \frac{29}{32} \frac{B+E+1}{2} \tag{5}$$

Symmetric formulas are uses to calculate approximate SAD values for the other half-pel locations c, d, e, f, g, and, h. In the preferred embodiment, after the approximate SAD values for the half-pel locations have been calculated the actual SAD values are computed only for the central point and selected ones of the half-pel points which have the smallest approximate SAD values. The half-pel points for performing actual SAD computations may be arrived at, for example, by taking a set number of half-pel points with the smallest approximate SAD values or, selecting the set of half-pel points which have between them a set number of the smallest approximate SAD values (these are not necessarily identical sets because two or more half-pel points could conceivably share the same approximate SAD value). The best candidate (with the lowest actual SAD value) is chosen as the half-pel estimated motion vector.

Interlaced video sequences such as broadcast television images can take advantage of interlaced motion compensation to obtain better quality images of image objects that move during the time interval between two fields. Two motion estimation modes exist. Frame motion estimation combines both fields of the interlaced video into one frame. Field motion estimation considers the fields separately. In field motion estimation two estimated motion vectors, one for the upper field and one for the lower field are produced for each frame.

If the SAD for the estimated motion vector produced by frame motion estimation is relatively small as determined at step 124 then it is not necessary to proceed with field motion estimation. In the embodiment of FIG. 3, field motion estimation (steps 128 through 140) is performed only if SAD is greater than or equal to a threshold $T_4$. Otherwise the field motion vector is set equal to zero (step 126).

Performing field motion estimation can double the required number of computations. Field motion estimation proceeds in a manner similar to that described above for frame motion estimation except that the starting point is the estimated motion vector checked at step 124 instead of a predicted motion vector. A low-resolution search is performed first (step 128). The result of the low resolution search is checked in step 130 to see if the SAD of the best candidate from the low-resolution search is less than a threshold $T_5$. If so then motion estimation finishes. If not then a full pel search is conducted (step 134).

The result of the full pel search is checked in step 136 to see if the SAD of the best candidate from the low-resolution search is less than a threshold $T_6$. If so then motion estimation finishes. If not then a half-pel search is conducted (step 140).

In the preferred embodiment of the invention, the parameter β stops searching for a better motion estimate (even if the most recent threshold is not satisfied) when the number of computations which have occurred in the search reach a computational constraint. This constraint may be, for example, expressed by the function:

$$J_\beta = SAD + \beta C_1 \qquad (6)$$

where $C_1$ is the number of operations performed so far for the motion estimate for the current block. An operation may be defined, for example, as one addition, one subtraction and one absolute value calculation. $C_1$ is incremented after each block matching function computation.

A search for a better motion estimate terminates when the minimum value $J_\beta$ for the current layer is larger than the minimum value $J_\beta$ for the previous layer. Since the number of calculations $C_1$ is always increasing the term $\beta\, C_1$ in equation (4) effectively cuts short the search process in a case where the SAD decreases gradually toward a minimum value. The parameter $\beta$ can be adjusted to trade off image quality for encoding speed. If $\beta=0$ then we obtain the straightforward implementation which is described above. For large values of $\beta$ the search is very fast but yields a relatively crude estimation of the motion vector. A stopping criteria which may be used in the invention is explained in more detail in: Y. Lee et al., *Predictive RD-constrained motion estimation for very low bit rate video coding*, IEEE Transactions on Selected Areas in Communications, vol. 15, p. 1752, December 1997.

After a motion estimate has been obtained then method 100 determines whether it is necessary to proceed with DCT coding (step 144). In step 144 the SAD for the best motion estimate is compared to a seventh threshold value $T_7$. If the SAD is less than $T_7$ then the DCT for the current block is set to zero (step 146). Otherwise, encoding computations are performed in step 148. The encoding mode is chosen based on variance measures of the original and motion-compensated macroblocks.

In the preferred embodiment of the invention, intra frame coding is used in cases where the motion compensation residual is relatively large. For example, if:

$$SAD^2 > 256 \times VAR \qquad (7)$$

where SAD is the minimum SAD value obtained during frame motion estimation and field motion estimation. Intra frame coding uses only information from within the frame. If this step results in the selection of the Inter-frame coding mode then the frame motion compensation mode is selected when the minimum SAD for frame motion estimation, $SAD_{FR}$ is related to the minimum SAD obtained in field motion estimation $SAD_{FD}$ as follows:

$$SAD_{FR} < 1.05 \times SAD_{FD} \qquad (8).$$

Finally, for both intra and inter coding modes, the DCT type is selected based on the correlation $\gamma$ between the two macroblock fields at the DCT input. If:

$$\gamma > 0.25 \qquad (9)$$

then these two fields are deemed to be strongly correlated and frame DCT is applied. Otherwise field DCT is applied. The constants in equations (5), (6) and (7) have been optimized for best tradeoff between computation and performance. Other mode selection algorithms could also be used.

Coding step 148 may involve performing a quantized DCT (QDCT) on the residual of the current macroblock. The QDCT is described in detail in K. Nguyen-Phi et al. *Quantized discrete cosine transform: A combination of DCT and scalar quantization*, Proc. of ICASSP (Phoenix Ariz.) vol. 6, pp. 3197–3200 March, 1999 which is hereby incorporated by reference. QDCT is computationally efficient because it embeds the quantization step into the integer multiplications that are required in performing a DCT. The matrix representation of an 8-point 1-dimensional DCT, y, of an 8 element vector $x=(x_0, x_1, x_2, \ldots, x_7)$ is:

$$y = Cx \qquad (10)$$

where:

$$y_k = \frac{c_k}{2} \sum_{i=0}^{7} x_i \cos\frac{(2i+1)k\pi}{16}, \qquad (11)$$

$$\text{where } k = 0, \ldots, 7 \text{ and } c_k = \begin{pmatrix} \frac{1}{\sqrt{2}} : k = 0 \\ 1 : k \neq o \end{pmatrix}$$

The quantized transform coefficients may be written as follows:

$$y_k^q = \left\lfloor \frac{y^k}{Q} \right\rfloor = \left\lfloor \sum_{i=0}^{7} c_{ki}^q x_i \right\rfloor \qquad (12)$$

In this case, Q is the quantization step, and $\lfloor\ \rfloor$ designates the rounding operator and $c_{ki}^q$ is given by:

$$c_{ki}^q = \frac{c_k \cos\frac{(2i+1)k\pi}{16}}{Q} \qquad (13)$$

The matrix representation of an 8-point 1 dimensional QDCT operation is:

$$y^q = \lfloor C^q x \rfloor \qquad (14)$$

where x is an 8×1 input vector, $C^q$ is an 8×8 QDCT transform matrix, and $y^q$ is an 8×1 output vector. The vector equations for a two dimensional QDCT can be written as follows:

$$Y^q = \lfloor C_r^q X C_c^{qT} \rfloor \qquad (15)$$

In equation (14) $C_r^q$ and $C_c^q$ are given by:

$$C_r^q = \frac{C}{Q_r}, \quad C_c^q = \frac{C}{Q_c}, \quad \text{where } Q_c \times Q_r = Q \qquad (16)$$

In preferred embodiments of the invention integer computations are employed to reduce the computation required for computing the QDCT. The QDCT coefficients are scaled up and rounded to the nearest integers. After the computations are complete, the results are scaled down by the same factor and rounded to integer values. The rounding operation can be avoided by approximating equation (14) as follows:

$$Y^q \approx \frac{C_i^q X (C_i^q)^T}{2^{2b}} \qquad (17)$$

It is usually desirable to choose the factor by which the coefficients are scaled up to yield integers of a minimum size which will yield acceptable results. The inventors have determined that when b is 10 (i.e. when the coefficients are scaled to yield 10-bit integers) there is virtually no loss of performance.

The QDCT computations themselves may be performed using any suitable QDCT algorithm. The currently preferred embodiment of the invention uses Chen's algorithm which is described in K. P. Rao et al. *Discrete cosine transforms: Algorithms, Advantages, Applications*, Academic Press, New York, 1990, which is incorporated herein by reference.

The quantization value may be constant. The MPEG-2 standard permits the use of custom quantization matrices for macroblocks coded in either of the intra and inter modes. In the currently preferred embodiment of the invention a non-constant visually optimized set of quantization matrices is used for intra coding and a constant set of quantization values is used for inter coding.

Preferably step 148 begins by performing only a partial computation of the QDCT. Only the first $N_c$ column DCT values are computed. If all $8 \times N_c$ values are equal to zero (smaller than a threshold) then the entire block can be set to zero as to a close approximation all other values are likely to also be zero. Otherwise, the remaining $8-N_c$ column QDCTs are computed. Then $N_r$ row QDCT values are calculated. If these $8 \times N_r$ values are equal to zero (smaller than a threshold) then the entire block can be set to zero as to a close approximation all other values are likely to also be zero after rounding. Otherwise the rest of the $8-N_r$ row values are computed. Variable-length coding (VLC) can then be performed on the resulting QDCT-encoded video data by coder 16.

In implementations of the invention which permit reordering of the columns of the QDCT transform matrix the zero block predictor can be made more precise by selecting the most significant subset of the rows and columns instead of just the first $N_c$ columns and the first $N_r$ rows. For example, FIGS. 8A through 8H show optimal ordering of columns in cases where $N_c$ is in the range of 1 through 8. For the row DCT computations the natural top-bottom row order should be optimum since the energy is already concentrated in the top (low vertical frequency) row of coefficients after the column computations.

It can be seen that this preferred embodiment for encoding step 148 has three parameters, K, the quantization value, $N_c$, and $N_r$. These parameters may be manipulated to achieve computation-distortion compromises in encoding step 148.

Figure 7:
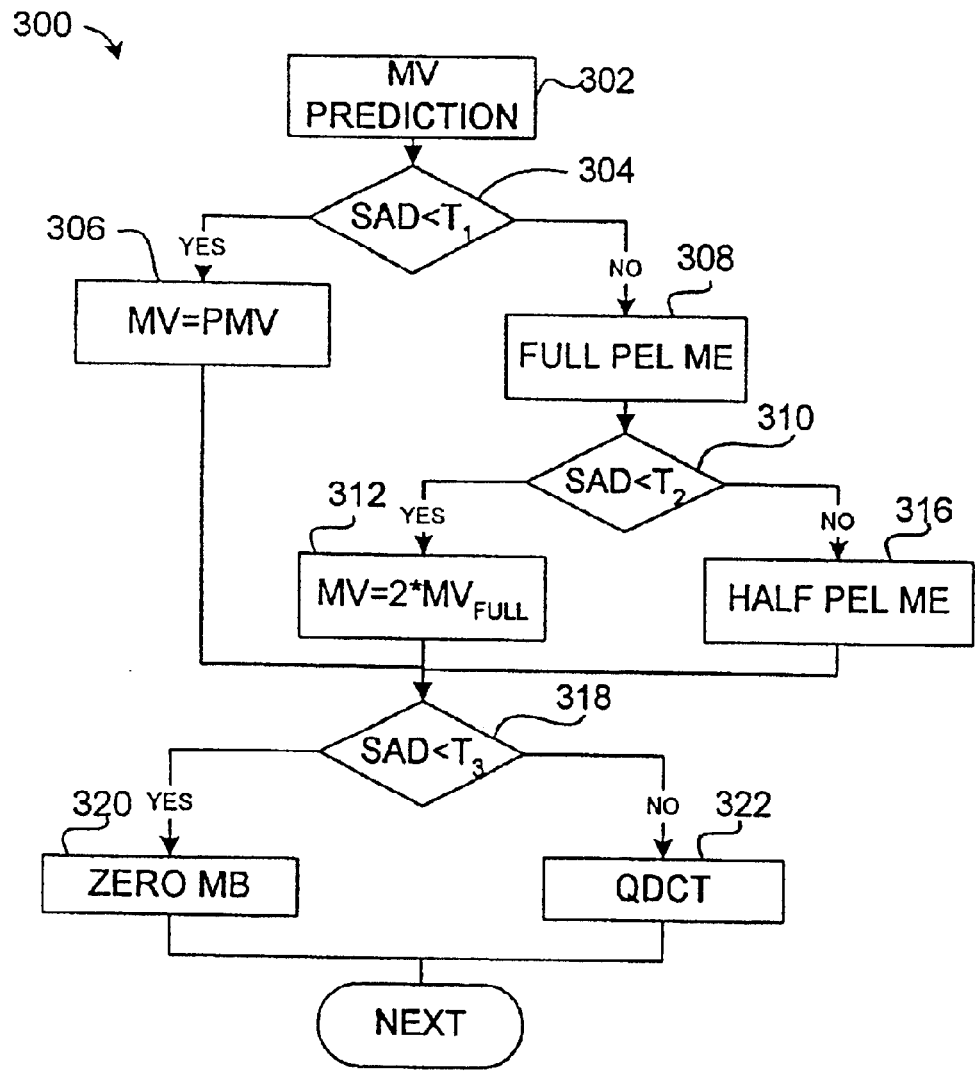
FIG. 7 is a flow chart illustrating a method for H.263 encoding according to the invention; and, FIGS. 8A through 8H are diagrams illustrating optimal column ordering for zero block prediction QDCT.

The foregoing description has described the application of this invention to MPEG-2 coding by way of example. However, the invention may be applied to other video coding systems as well. For example, FIG. 7 illustrates a method 300 for of H.263 coding according to the invention.

Method 300 begins with a motion vector prediction step 304, substantially as described above. After step 304 the SAD is computed for the predicted motion vector. If the SAD is less than a threshold $T_1$ then the predicted motion vector is used as the estimated motion vector for the frame. Method 300 proceeds to step 318 which determines whether or not it is necessary to perform any QDCT computations. If the SAD for the motion vector predicted by step 304 is greater than or equal to threshold $T_1$ then method 300 proceeds to attempt to determine a better estimated motion vector by performing a full pel search (step 308).

The SAD for the best motion vector located by step 308 is computed and compared to a second threshold $T_2$ in step 310. If step 310 determines that the SAD is less than threshold $T_2$ then method 300 uses the best motion vector located by step 308 as the estimated motion vector for the frame and proceeds to step 318. If the SAD for the motion vector predicted by step 308 is greater than or equal to threshold $T_2$ then method 300 proceeds to attempt to determine a better estimated motion vector by performing a half pel search (step 316).

In step 318 the SAD for the best estimated motion vector is compared to a third threshold $T_3$. If the SAD is less than threshold $T_3$ then it is likely that the result of QDCT computations for that macroblock, would be zero (or substantially zero) and the QDCT values are set to zero without doing any QDCT computations (step 320). Otherwise QDCT computations are performed (step 322). The QDCT computations may be performed substantially as described above with the exception that mode selection is simpler since H.263 coding does not support interlaced video or backward motion compensation.

In order to achieve low bit rates during H.263 coding it can be preferable to decrease the SAD corresponding to the motion vector (0,0). This biases the method in favour of selecting (0,0) as the estimated motion vector when the estimated motion vector is close to (0,0). The SAD for the (0,0) motion vector may be decreased, for example, by a value in the range of 80–120 and is preferably decreased by about 100.

After motion estimation, the coding mode (inter or intra) is preferably chosen by applying a variance measure to compare the macroblock currently being coded to the corresponding macroblock in the previous frame (which is displaced relative to the current macroblock by the estimated motion vector). For example, the variance may be computed as follows:

$$A = \sum_{i=0}^{256} |\text{Original} - MB_{mean}| \qquad (18)$$

where "Original" is the value of the $i^{th}$ pixel in the previous frame, $MB_{mean}$ is the mean value of the current macroblock. If:

$$A < SAD - 500 \qquad (19)$$

then the intra encoding mode is selected. Otherwise the inter encoding mode is selected.

Preferred implementations of the invention comprise computers running software instructions which cause the computers to execute a method of the invention. The invention may also be provided in the form of a program product. The program product may comprise any medium which carries a set of computer-readable signals containing instructions which, when run by a computer, cause the computer to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

As will be apparent to those skilled in the art in the light of the foregoing disclosure, many alterations and modifications are possible in the practice of this invention without departing from the spirit or scope thereof. For example:

Where a decision is made depending upon whether or not a value is greater than a threshold or less than the threshold, it is a matter of design convenience how to deal with cases in which the value is equal to the threshold.

While the foregoing description uses the sum of absolute differences (SAD) as a measure of how good a match exists between two blocks other similarity measures could also be used.

While it makes sense to do so, it is not necessary to compute the similarity measure used in different comparison steps in the same manner. A SAD could be used for some comparisons and a different similarity measure could be used for other comparisons.

Alternative constructions for motion estimator 12, mode selector 14 and coder 16 may be used within this invention in place of the preferred constructions described above.

The foregoing description uses the DCT to encode residual data. The invention could also be applied in cases which use other transformations such as DST, KLT etc.

Instead of using a previously determined and stored set of operating points, the invention could include a block which computes new sets of operating points while encoding is being performed. This may be done, for example, by providing a model for a curve on which the optimum operating points have previously been found to lie and computing a new operating point from the model.

The embodiment of the invention illustrated in FIG. 1 includes both a speed control 20 and a bit rate control 22. While this is preferred, embodiments of the invention could have a speed control 20 but not a bit rate control 22 or vice versa. More basic embodiments of the invention could lack both a speed control 20 and a rate control 22.

Accordingly, the scope of the invention is to be construed in accordance with the substance defined by the following claims.

What is claimed is:

1. A method for obtaining an estimated motion vector for use in block-based video encoding, the method comprising:

refining a predicted motion vector for a current block to obtain an estimated motion vector in a sequence comprising a plurality of steps; and, before each of a plurality of the steps in the sequence, computing a similarity value between the block and another block indicated by the current estimated motion vector, comparing the similarity value to a threshold, and not performing subsequent steps in the sequence if the comparison indicates that the current estimated motion vector provides a match between the current block and the another block which is better than a match corresponding to the threshold wherein;

refining the predicted motion vector comprises performing one or more frame motion estimation steps and, before the frame motion estimation steps, computing a first similarity value between the current block and a block identified by the predicted motion vector, comparing the first similarity value to a first threshold, and using the predicted motion vector as the estimated motion vector if the comparison indicates that the block identified by the predicted motion vector provides a better match than the first threshold;

the frame motion estimation steps comprise a low resolution frame motion estimation step and a full pel frame motion estimation step and the method comprises computing a second similarity value between the current block and a block identified by the estimated motion vector of the low resolution frame motion estimation step, comparing the second similarity value to a second threshold, and not performing the full pel frame motion estimation step if the comparison indicates that the block identified by estimated motion vector of the low resolution frame motion estimation step provides a better match than the second threshold; and, the frame motion estimation steps comprise a half pel frame motion estimation step and the method comprises computing a third similarity value between the current block and a block identified by the estimated motion vector of the full pel frame motion estimation step, comparing the third similarity value to a third threshold, and not performing the half pel frame motion estimation step if the comparison indicates that the block identified by estimated motion vector of the full pel frame motion estimation step provides a better match than the third threshold.

2. The method of claim 1 wherein the similarity measure is a sum of absolute differences.

3. The method of claim 1 comprising obtaining the predicted motion vector by computing a similarity measure between the block and each of a plurality of other blocks indicated by prior estimated motion vectors previously computed for a plurality of previously encoded nearby blocks and using as the predicted motion vector one of the prior estimated motion vectors for which the similarity measure indicates a best match for the current block.

4. The method of claim 3 wherein the similarity measure used in obtaining the predicted motion vector is a sum of absolute differences.

5. The method of claim 3 wherein the plurality of nearby blocks comprise a block immediately to the left of the current block, a block immediately above the current block and a block above and to the right of the current block.

6. The method of claim 5 wherein the plurality of nearby blocks comprise a block in the same position as the current block in an immediately preceding frame.

7. The method of claim 1 wherein refining the predicted motion vector comprises performing one or more field motion estimation steps following the one or more frame motion estimation steps.

8. The method of claim 7 wherein the field motion estimation steps comprise a low resolution field motion estimation step, a full pel field motion estimation step and a half pel field motion estimation step.

9. The method of claim 1 comprising computing a fourth similarity value between the current block and a block identified by the estimated motion vector of the frame motion estimation steps, comparing the fourth similarity value to a fourth threshold, and performing one or more field motion estimation steps if the comparison indicates that the block identified by estimated motion vector of the frame motion estimation steps provides a match poorer than the fourth threshold.

10. The method of claim 9 wherein the field motion estimation steps comprise a low resolution field motion estimation step and a full pel field motion estimation step and the method comprises computing a fifth similarity value between the current block and a block identified by the estimated motion vector of the low resolution field motion estimation step, comparing the fifth similarity value to a fifth threshold, and not performing the full pel field motion estimation if the comparison indicates that the block identified by estimated motion vector of the low resolution field motion estimation step provides a better match than the fifth threshold.

11. The method of claim 10 wherein the field motion estimation steps comprise a half pel field motion estimation step and the method comprises computing a sixth similarity value between the current block and a block identified by the estimated motion vector of the full pel field motion estimation step, comparing the sixth similarity value to a sixth threshold, and not performing the half pel field motion estimation step if the comparison indicates that the block identified by estimated motion vector of the full pel frame motion estimation step provides a better match than the sixth threshold.

12. The method of claim 11 comprising computing a seventh similarity value between the current block and a block identified by the estimated motion vector, comparing the seventh similarity value to a seventh threshold, and not performing a quantized DCT operation on the current block if the comparison indicates that the block identified by estimated motion vector provides a match better than the seventh threshold.

13. A program product comprising a medium carrying a set of computer-readable signals containing computer-executable instructions which, when run by a computer, cause the computer to execute the method of claim 1.

* * * * *